(12) United States Patent
Filippov et al.

(10) Patent No.: US 10,728,548 B2
(45) Date of Patent: Jul. 28, 2020

(54) PROCESSING REFERENCE SAMPLES USED FOR INTRA-PREDICTION OF A PICTURE BLOCK

(71) Applicant: Futurewei Technologies, Inc., Plano, TX (US)

(72) Inventors: Alexey Filippov, Moscow (RU); Vasily Rufitskiy, Moscow (RU); Haitao Yang, Shenzhen (CN); Maxim Sychev, Moscow (RU)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/943,853

(22) Filed: Apr. 3, 2018

(65) Prior Publication Data
US 2018/0288413 A1 Oct. 4, 2018

Related U.S. Application Data

(60) Provisional application No. 62/481,525, filed on Apr. 4, 2017.

(51) Int. Cl.
*H04N 19/117* (2014.01)
*H04N 19/44* (2014.01)
(Continued)

(52) U.S. Cl.
CPC ......... *H04N 19/117* (2014.11); *H04N 19/157* (2014.11); *H04N 19/182* (2014.11);
(Continued)

(58) Field of Classification Search
None
See application file for complete search history.

(56) References Cited

U.S. PATENT DOCUMENTS 8,649,431 B2   2/2014  Cheon et al.
9,179,148 B2 * 11/2015  Li ....................... H04N 19/105
(Continued)

FOREIGN PATENT DOCUMENTS

CN   102939760 A   2/2013
CN   103621079 A   3/2014
(Continued)

OTHER PUBLICATIONS

Foreign Communication From a Counterpart Application, Taiwanese Application No. 107112057, Taiwanese Office Action dated Mar. 28, 2019, 13 pages.
(Continued)

*Primary Examiner* — Christopher G Findley
(74) *Attorney, Agent, or Firm* — Conley Rose, S.C.

(57) ABSTRACT

A method of coding implemented by a decoding device. The method includes determining a prediction direction for a current block, determining a propagation distance along the prediction direction, the propagation distance measured between a pixel to be predicted in the current block and a reference sample adjacent to the current block, selecting one of a plurality of filter coefficients based on the propagation distance, predicting the pixel in the current block using a filter and the one of the plurality of filter coefficients that was selected, and displaying an image including the pixel that was predicted.

20 Claims, 10 Drawing Sheets

(51) Int. Cl.
*H04N 19/182* (2014.01)
*H04N 19/50* (2014.01)
*H04N 19/157* (2014.01)
*H04N 19/82* (2014.01)
*H04N 19/593* (2014.01)

(52) U.S. Cl.
CPC .......... *H04N 19/44* (2014.11); *H04N 19/50* (2014.11); *H04N 19/593* (2014.11); *H04N 19/82* (2014.11)

(56) References Cited

U.S. PATENT DOCUMENTS

| | | | |
|---|---|---|---|
| 2008/0247467 | A1 | 10/2008 | Rusanovskyy et al. |
| 2008/0267297 | A1 | 10/2008 | Sampedro et al. |
| 2009/0225842 | A1 | 9/2009 | Cheon et al. |
| 2010/0225790 | A1* | 9/2010 | Sasaki .................. G06T 5/50 348/241 |
| 2012/0027313 | A1 | 2/2012 | Xu et al. |
| 2012/0051438 | A1 | 3/2012 | Chong et al. |
| 2012/0140821 | A1 | 6/2012 | Drugeon et al. |
| 2012/0147955 | A1 | 6/2012 | Budagavi |
| 2012/0183041 | A1 | 7/2012 | Maani |
| 2012/0230393 | A1 | 9/2012 | Naing et al. |
| 2013/0028327 | A1 | 1/2013 | Narroschke et al. |
| 2013/0094569 | A1 | 4/2013 | Chong et al. |
| 2013/0114708 | A1 | 5/2013 | Van der Auwera et al. |
| 2013/0243104 | A1 | 9/2013 | Chen et al. |
| 2013/0301720 | A1* | 11/2013 | Lee .................. H04N 19/122 375/240.12 |
| 2014/0056352 | A1* | 2/2014 | Park .................. H04N 19/117 375/240.12 |
| 2015/0172677 | A1 | 6/2015 | Norkin |
| 2015/0178890 | A1 | 6/2015 | Alshina et al. |
| 2015/0229965 | A1 | 8/2015 | Park et al. |
| 2016/0309183 | A1* | 10/2016 | Sun .................. H04N 19/124 |
| 2016/0366422 | A1 | 12/2016 | Yin et al. |
| 2017/0041619 | A1 | 2/2017 | Lee et al. |
| 2017/0094285 | A1* | 3/2017 | Said .................. H04N 19/593 |
| 2018/0288408 | A1* | 10/2018 | Ikai .................. H04N 19/117 |

FOREIGN PATENT DOCUMENTS

| | | |
|---|---|---|
| CN | 104041045 A | 9/2014 |
| CN | 104067613 A | 9/2014 |
| CN | 106063265 A | 10/2016 |
| EP | 2665274 A1 | 11/2013 |
| EP | 2774368 | 9/2014 |
| WO | 2009110741 A2 | 9/2009 |
| WO | 2009110741 A3 | 9/2009 |
| WO | 2013067320 A1 | 5/2013 |
| WO | 2015178796 A1 | 11/2015 |
| WO | 2017086823 A1 | 5/2017 |
| WO | 2017111648 A1 | 6/2017 |

OTHER PUBLICATIONS

Foreign Communication From a Counterpart Application, Taiwanese Application No. 107112057, Taiwanese Search Report dated Mar. 27, 2019, 1 page.

"Information technology—High efficiency coding and media delivery in heterogeneous environments—Part 2: High efficiency video coding," ISO/IEC 23008-2, First edition, Dec. 1, 2013, 13 pages.
Zheng, Y., et al., "CE13: Mode Dependent Hybrid Intra Smoothing," XP030008322, JCTVC-D282, Jan. 20-28, 2011, 5 pages.
Maani, E., et al., "Improvement of Adaptive Intra Smoothing by switching interpolation filters," XP030047737, JCTVC-D391, Jan. 20-28, 2011, 3 pages.
Maani, E., et al., "Improvement of Adaptive Intra Smoothing by switching interpolation filters," JCTVC-D391_r1, Jan. 20-28, 2011, 3 pages.
Dong, J., "Crosscheck for JCTVC-G358 new modes for chroma intra prediction," JCTVC-G273, Nov. 21-30, 2011, 1 page.
Bossen, F., "Common test conditions and software reference configurations," JCTVC-L1100, WG11 No. m28412, Jan. 14-23, 2013, 4 pages.
Chen, H., et al., "Non-RCE2: Enhanced angular intra prediction for screen content coding," XP030114668, JCTVC-N0183, Jul. 25-Aug. 2, 2013, 9 pages.
Bossen, F., et al., "HM Software Manual," JCTVC-Software Manual, Jun. 18, 2015, 27 pages.
Sullivan, G., et al., "Overview of the High Efficiency Video Coding (HEVC) Standard," XP55045358, IEEE Transactions on Circuits and Systems for Video Technology, vol. 22, No. 12, Dec. 2012, pp. 1649-1668.
Huawei Tech Ltd Co., "Reference Sample Adaptive Filtering for Intra Coding," COM16-C 983 R1-E, Sep. 2015, 4 pages.
Filippov, A., et al., "Adaptive Segmentation-based Filtering of Reference Samples for Intra Prediction," IEEE, 2014, pp. 526-529.
"Series H: Audiovisual and Multimedia Systems, Infrastructure of audiovisual services—Coding of moving video, High efficiency video coding," ITU-T, H.265, Apr. 2013, 317 pages.
Clare, G., et al., "Sign Data Hiding," JCTVC-G271, m21833, Nov. 21-30, 2011, 9 pages.
Bossen, F., et al., "Common test conditions and software references configurations," JCTVC-L1100, m28412, Jan. 14-23, 2013, 4 pages.
Chen, J., et al., "Algorithm Description of Joint Exploration Test Model 1," JVET-A1001, Oct. 19-21, 2015, 27 pages.
Alshina, E., et al., "Known tools performance investigation for next generation video coding," VCEG-AZ05, Jun. 19-26, 7 pages.
Chen, J., et al., "Further improvements to HMKTA-1.0," VCEG-AZ07_v2, Jun. 19-26, 2015, 9 pages.
Foreign Communication From a Counterpart Application, European Application No. 18781619.4, Extended European Search Report dated Dec. 16, 2019, 12 pages.
Tsai, C., et al., "Adaptive Loop Filtering for Video Coding," IEEE Journal of Selected Topics in Signal Processing, vol. 7, No. 6, Dec. 2013, 12 pages.
Foreign Communication From a Counterpart Application, PCT Application No. PCT/CN2018/081808, English Translation of International Search Report dated Jul. 6, 2018, 10 pages.
Foreign Communication From a Counterpart Application, PCT Application No. PCT/CN2018/081808, English Translation of Written Opinion dated Jul. 6, 2018, 4 pages.

* cited by examiner

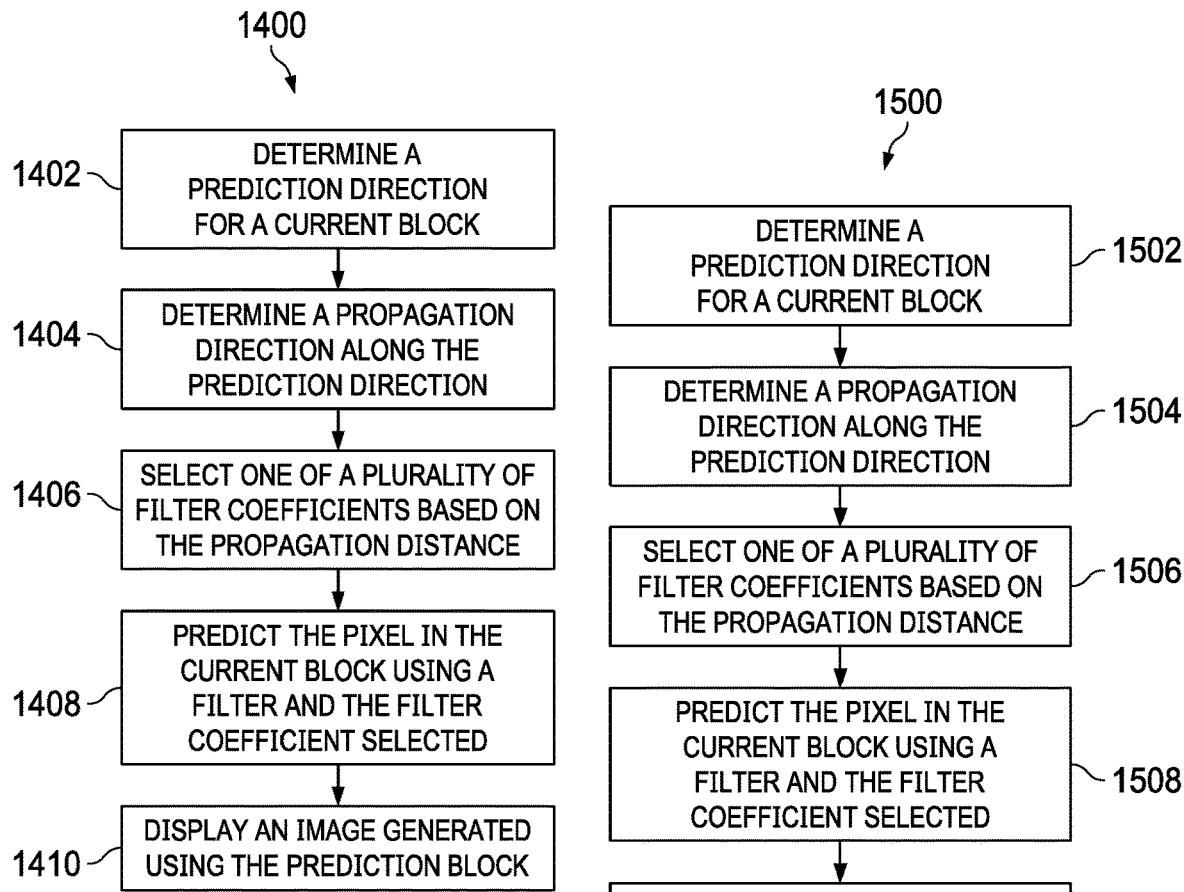
FIG. 14
FIG. 15
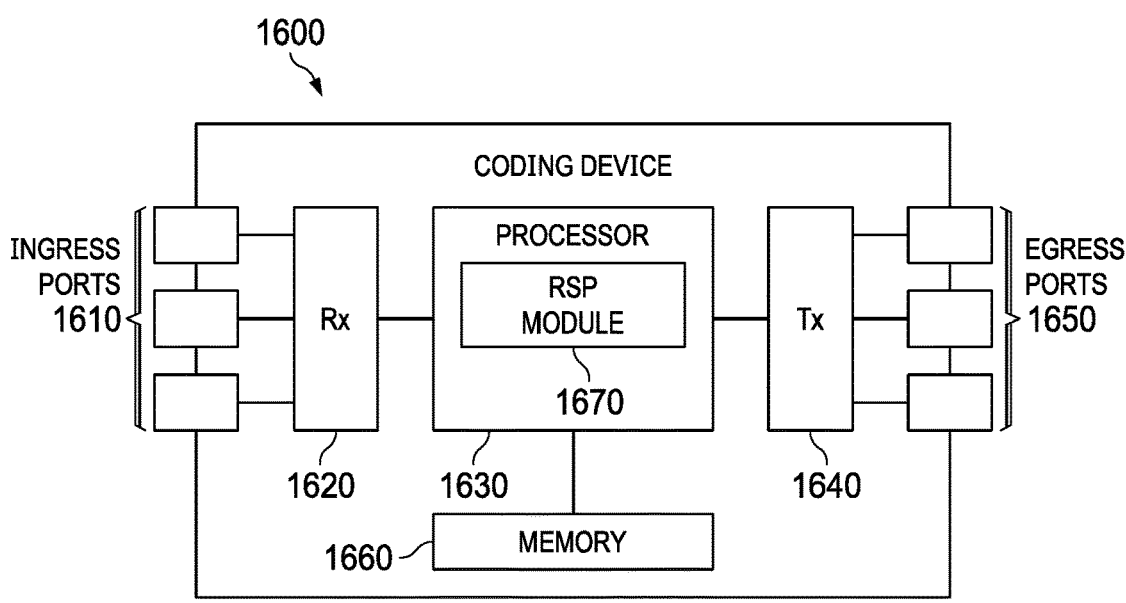
FIG. 16

PROCESSING REFERENCE SAMPLES USED FOR INTRA-PREDICTION OF A PICTURE BLOCK

CROSS-REFERENCE TO RELATED APPLICATIONS

This patent application claims the benefit of U.S. Provisional Patent Application No. 62/481,525, filed Apr. 4, 2017, by Alexey Filippov, et al., and titled "Method and Apparatus for Processing Reference Samples Used for Intra-Prediction of a Picture Block," the teaching and disclosure of which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method of coding implemented by a coding device. The method includes a method of coding implemented by a decoding device. The method includes determining, by the decoding device, a prediction direction for a current block; determining, by the decoding device, a propagation distance along the prediction direction, the propagation distance measured between a pixel to be predicted in the current block and a reference sample adjacent to the current block; selecting, by the decoding device, one of a plurality of filter coefficients based on the propagation distance; predicting, by the decoding device, the pixel in the current block using a filter and the one of the plurality of filter coefficients that was selected; and displaying, on a display of an electronic device, an image including the pixel that was predicted.

Optionally, in any of the preceding aspects, another implementation of the aspect provides that a strength of the one of the filter coefficients that was selected is based on the propagation distance that was determined. Optionally, in any of the preceding aspects, another implementation of the aspect provides that the plurality of filter coefficients contains a range of filter coefficients from weak to strong. Optionally, in any of the preceding aspects, another implementation of the aspect provides that the range of filter coefficients contains weaker filter coefficients corresponding to shorter propagation distances and stronger filter coefficients corresponding to longer propagation distances. Optionally, in any of the preceding aspects, another implementation of the aspect provides that the prediction direction is horizontal or vertical.

Optionally, in any of the preceding aspects, another implementation of the aspect provides that the prediction direction is diagonal. Optionally, in any of the preceding aspects, another implementation of the aspect provides that the filter is a smoothing filter. Optionally, in any of the preceding aspects, another implementation of the aspect provides that the filter is a sharpening filter. Optionally, in any of the preceding aspects, another implementation of the aspect provides storing a table mapping a range of propagation distances to the plurality of filter coefficients in a memory of the decoding device.

In an embodiment, the disclosure includes a method of coding implemented by a coding device. The method includes a method of coding implemented by an encoding device. The method includes determining, by the encoding device, a prediction direction for a current block; determining, by the encoding device, a propagation distance along the prediction direction, the propagation distance measured between a pixel to be predicted in the current block and a reference sample adjacent to the current block; selecting, by the encoding device, one of a plurality of filter coefficients based on the propagation distance; predicting, by the encoding device, the pixel in the current block using a filter and the one of the plurality of filter coefficients that was selected; and transmitting, by the encoding device, a bitstream containing an image including the pixel to a decoding device configured to decode the bitstream.

Optionally, in any of the preceding aspects, another implementation of the aspect provides that a strength of the one of the filter coefficients that was selected is based on the propagation distance that was determined. Optionally, in any of the preceding aspects, another implementation of the aspect provides that the plurality of filter coefficients contains a range of filter coefficients from weak to strong. Optionally, in any of the preceding aspects, another implementation of the aspect provides that the range of filter coefficients contains weaker filter coefficients corresponding to shorter propagation distances and stronger filter coefficients corresponding to longer propagation distances. Optionally, in any of the preceding aspects, another implementation of the aspect provides that the prediction direction is diagonal. Optionally, in any of the preceding aspects, another implementation of the aspect provides that the filter is a smoothing filter. Optionally, in any of the preceding aspects, another implementation of the aspect provides that the filter is a sharpening filter.

In an embodiment, the disclosure includes a decoding device including a receiver configured to receive a bitstream from an encoding device, the bitstream containing an image; a processor coupled to the receiver, the processor configured to: select a current block from within the image; determine a prediction direction for the current block; determine a propagation distance along the prediction direction, the propagation distance measured between a pixel to be predicted in the current block and a reference sample adjacent to the current block; select one of a plurality of filter coefficients based on the propagation distance; predict the pixel in the current block using a filter and the one of the plurality of filter coefficients that was selected; and a display operably coupled to the processor, the display configured to display an image including the pixel that was predicted.

Optionally, in any of the preceding aspects, another implementation of the aspect provides that a strength of the one of the filter coefficients that was selected is based on the propagation distance that was determined. Optionally, in any of the preceding aspects, another implementation of the aspect provides that the plurality of filter coefficients contains a range of filter coefficients from weak to strong, and wherein the range of filter coefficients contains weaker filter coefficients corresponding to shorter propagation distances and stronger filter coefficients corresponding to longer propagation distances. Optionally, in any of the preceding aspects, another implementation of the aspect provides a memory coupled to the processor, the memory configured to store a table mapping a range of propagation distances to the plurality of filter coefficients.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 14 is an embodiment of a method of coding implemented by a decoding device.

FIG. 15 is an embodiment of a method of coding implemented by an encoding device.

FIG. 16 is a schematic diagram of a coding device.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
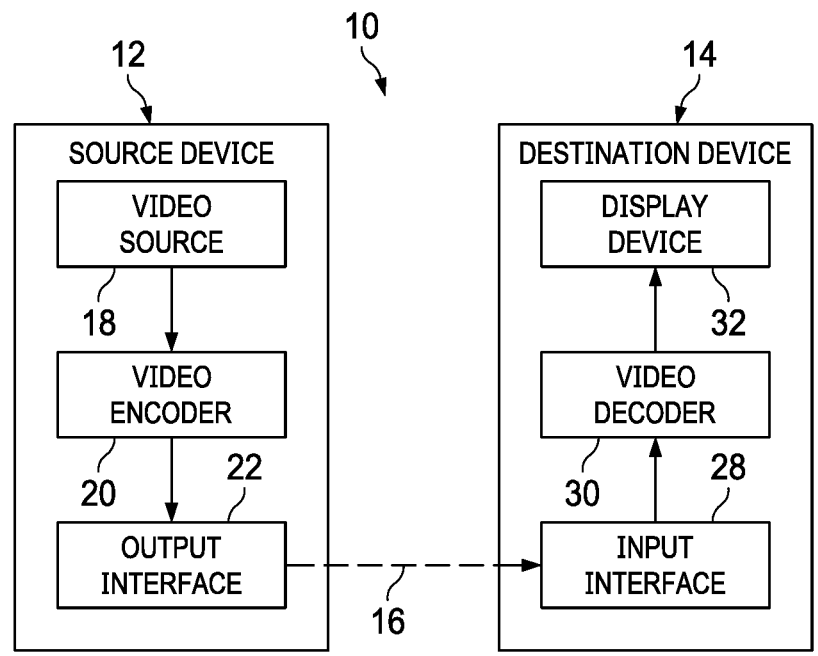
FIG. 1 is a block diagram illustrating an example coding system that may utilize bi-lateral prediction techniques.

FIG. 1 is a block diagram illustrating an example coding system 10 that may utilize bidirectional prediction techniques. As shown in FIG. 1, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 28. The storage device may include any of a variety of distributed or locally accessed data storage media such as a hard drive, Blu-ray discs, digital video disks (DVD)s, Compact Disc Read-Only Memories (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over hypertext transfer protocol (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 and/or the video decoder 30 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1 is merely one example. Techniques for bidirectional prediction may be performed by any digital video encoding and/or decoding device. Although the techniques of this disclosure generally are performed by a video coding device, the techniques may also be performed by a video encoder/decoder, typically referred to as a "CODEC." Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the International Telecommunications Union Telecommunication Standardization Sector (ITU-T) H.264 standard, alternatively referred to as Motion Picture Expert Group (MPEG)-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

Figure 2:
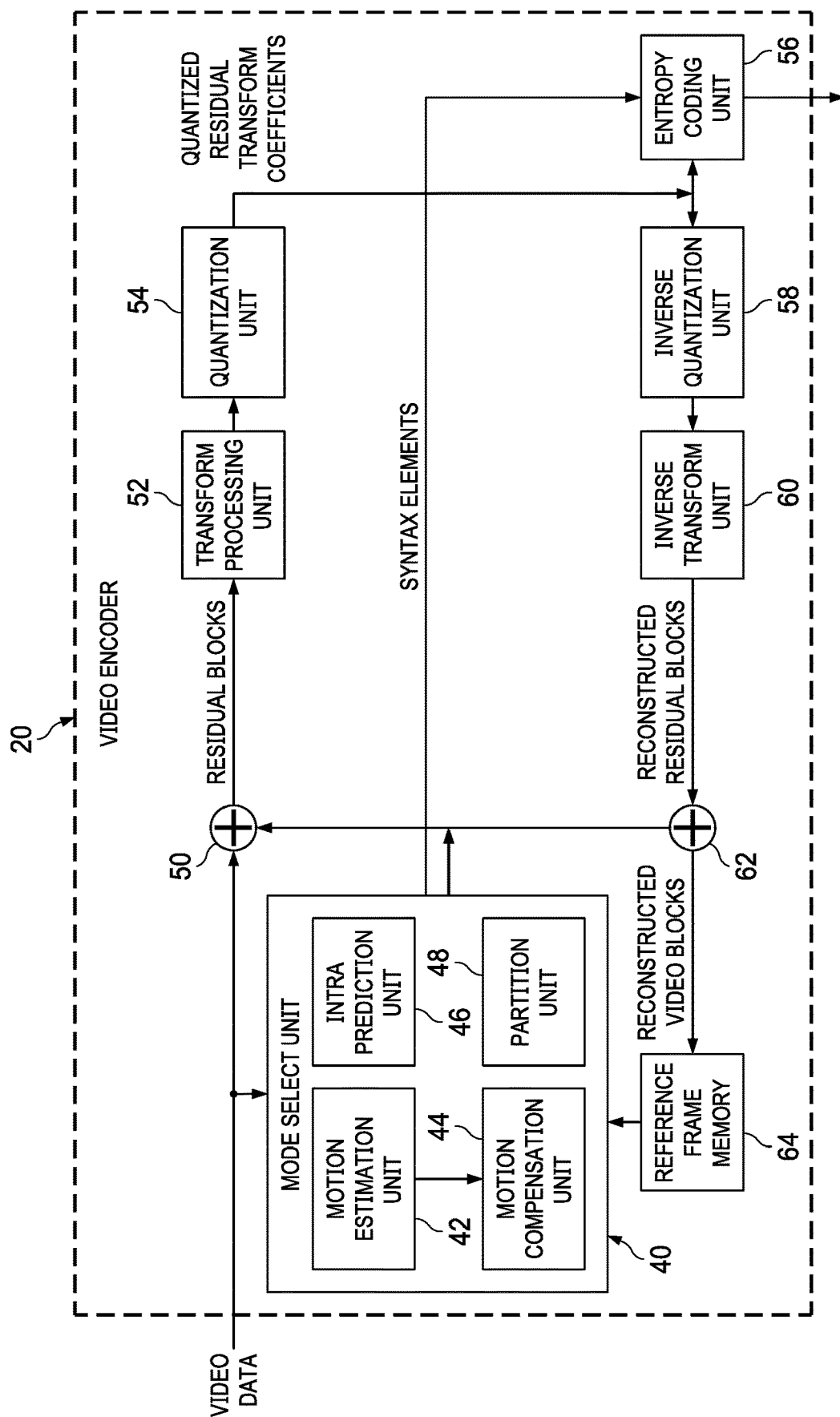
FIG. 2 is a block diagram illustrating an example video encoder that may implement bi-lateral prediction techniques.

FIG. 2 is a block diagram illustrating an example of video encoder 20 that may implement bidirectional prediction techniques. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 2, video encoder 20 includes mode select unit 40, reference frame memory 64, summer 50, transform processing unit 52, quantization unit 54, and entropy coding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into largest coding units (LCUs), and partition each of the LCUs into sub-coding units (sub-CUs) based on rate-distortion analysis (e.g., rate-distortion optimization). Mode select unit 40 may further produce a quad-tree data structure indicative of partitioning of a LCU into sub-CUs. Leaf-node CUs of the quad-tree may include one or more prediction units (PUs) and one or more transform units (TUs).

The present disclosure uses the term "block" to refer to any of a CU, PU, or TU, in the context of HEVC, or similar data structures in the context of other standards (e.g., macroblocks and sub-blocks thereof in H.264/AVC). A CU includes a coding node, PUs, and TUs associated with the coding node. A size of the CU corresponds to a size of the coding node and is square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quad-tree. A TU can be square or non-square (e.g., rectangular) in shape.

Mode select unit 40 may select one of the coding modes, intra- or inter-, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy coding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

In addition, intra-prediction unit 46 may be configured to code depth blocks of a depth map using a depth modeling mode (DMM). Mode select unit 40 may determine whether an available DMM produces better coding results than an intra-prediction mode and the other DMMs, e.g., using rate-distortion optimization (RDO). Data for a texture image corresponding to a depth map may be stored in reference frame memory 64. Motion estimation unit 42 and motion compensation unit 44 may also be configured to inter-predict depth blocks of a depth map.

After selecting an intra-prediction mode for a block (e.g., a conventional intra-prediction mode or one of the DMMs), intra-prediction unit 46 may provide information indicative of the selected intra-prediction mode for the block to entropy coding unit 56. Entropy coding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

Transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy coding unit 56 entropy codes the quantized transform coefficients. For example, entropy coding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy coding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
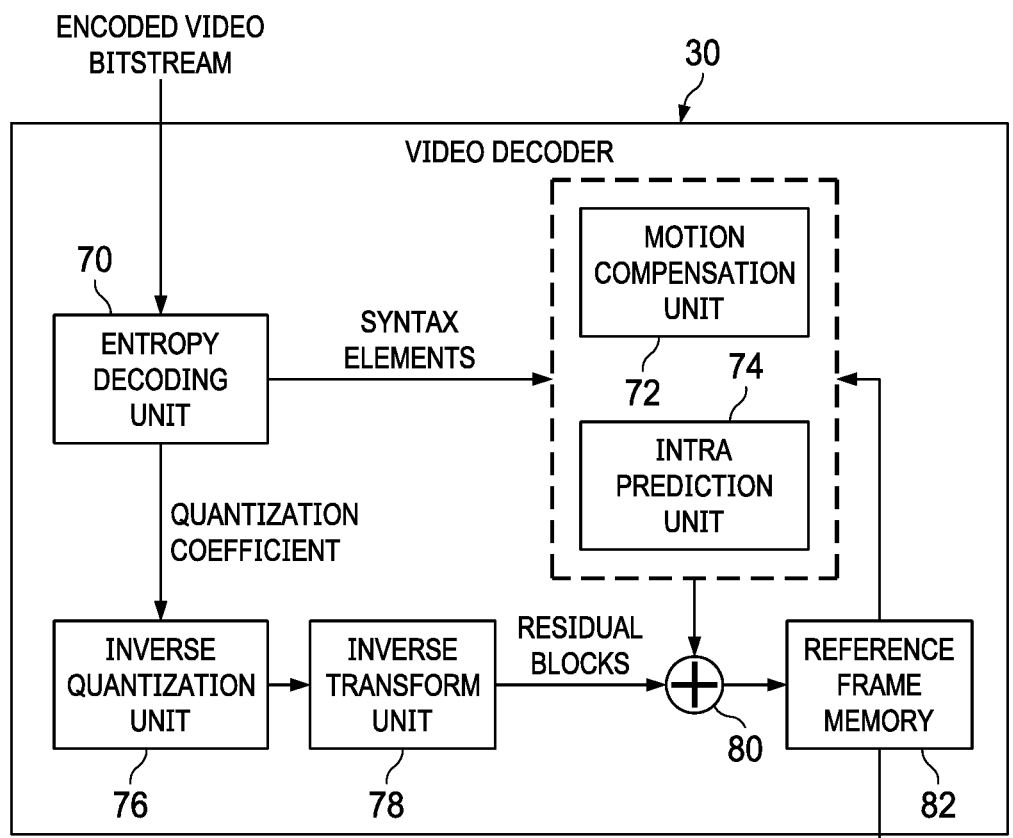
FIG. 3 is a block diagram illustrating an example of a video decoder that may implement bi-lateral prediction techniques.

FIG. 3 is a block diagram illustrating an example of video decoder 30 that may implement bidirectional prediction techniques. In the example of FIG. 3, video decoder 30 includes an entropy decoding unit 70, motion compensation unit 72, intra-prediction unit 74, inverse quantization unit 76, inverse transformation unit 78, reference frame memory 82, and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of the video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra-prediction unit 74 may generate prediction data for a video block of the current video slice based on a signaled intra-prediction mode and data from previously decoded blocks of the current frame or picture. When the video frame is coded as an inter-coded (e.g., B, P, or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Data for a texture image corresponding to a depth map may be stored in reference frame memory 82. Motion compensation unit 72 may also be configured to inter-predict depth blocks of a depth map.

As will be appreciated by those in the art, the coding system 10 of FIG. 1 is suitable for implementing various video coding techniques including, but not limited to, filtering based on propagation distance, signal hiding, and filtering based on filter information obtained from neighboring blocks as will be more fully explained below.

Digital video communication and storage applications are implemented by a wide range of digital devices, e.g., digital cameras, cellular radio telephones, laptops, broadcasting systems, video teleconferencing systems, and so on. One of the most important and challenging tasks of these applications is video compression. The task of video compression is complex and constrained by two contradicting parameters: compression efficiency and computational complexity. Video coding standards, such as ITU-T H.264/AVC or ITU-T H.265/HEVC, provide a good tradeoff between these parameters.

State-of-the-art video coding standards are mostly based on partitioning of a source picture into blocks. Processing of these blocks depends on their size, spatial position, and a coding mode specified by an encoder. Coding modes can be classified into two groups according to the type of prediction: intra-prediction and inter-prediction modes. Intra-prediction modes use pixels of the same picture to generate reference samples to calculate the prediction values for the pixels of the block being reconstructed. Intra-prediction can also be referred to as spatial prediction. Inter-prediction modes are designed for temporal prediction and use reference samples of previous or next pictures (e.g., neighbor blocks) to predict pixels of the block of the current picture.

Due to different types of redundancy, prediction processes for intra- and inter-coding are different. Intra-prediction typically constructs a one-dimensional buffer of reference samples. Inter-prediction typically uses sub-pixel interpolation of a two-dimensional reference pixel matrix. To improve prediction results, additional processing can be used for both intra- and inter-coding (e.g., smoothing of reference samples for intra-prediction, sharpening of reference blocks for inter-prediction).

The recently adopted ITU-T H.265/HEVC standard (ISO/IEC 23008-2:2013, "Information technology—High efficiency coding and media delivery in heterogeneous environments—Part 2: High efficiency video coding", November 2013) declares a set of state-of-the-art video coding tools that provide a reasonable tradeoff between coding efficiency and computational complexity.

Similar to the ITU-T H.264/AVC video coding standard, the HEVC/H.265 video coding standard provides for a division of the source picture into blocks, e.g., CUs. Each of the CUs can be further split into either smaller CUs or PUs. A PU can be intra- or inter-predicted according to the type of processing applied for the pixels of the PU. In case of inter-prediction, a PU represents an area of pixels that is processed by motion compensation using a motion vector specified for a PU. For intra-prediction PU specifies prediction mode for a set of TUs. A TU can have different sizes (e.g., 4×4, 8×8, 16×16, and 32×32 pixels) and can be processed in different ways. For a TU, transform coding is performed, i.e., the prediction error is being transformed with a DT) and quantized. Hence, reconstructed pixels contain quantization noise and blocking artifacts that can influence prediction accuracy.

In order to reduce this influence on intra-prediction, reference pixels filtering has been adopted for HEVC/H.265. For inter-prediction, reference pixels are calculated using sub-pixel interpolation. Reference pixels smoothing in the case of motion compensation can be combined with anti-aliasing filtering of a sub-pixel interpolation process.

Mode adaptive intra-prediction smoothing techniques have been presented. Smoothing filtering depends on the selected intra-prediction mode and a flag encoded in the video bit stream. Depending on the defined intra-prediction mode for a block, reference samples can be either smoothed by a filter or used without being modified. For the case when reference samples are smoothed, selection of smoothing filter can also be based on intra-prediction mode. Additionally, this selection can be performed according to the value of a flag reconstructed from a bit stream.

The current HEVC/H.265 standard partially uses this technique. Specifically, filter smoothing is turned off for several combinations of intra-mode and block size.

A reference sample adaptive filter (RSAF) has been suggested as an extension of the reference sample filter adopted for the HEVC/H.265 standard. This adaptive filter divides or segments reference samples before smoothing to apply different filters to different segments. In addition, a data hiding procedure has been used to signal a smoothing flag. A simplified version of adaptive filter for reference samples was adopted for the Joint Exploration Model 1 (JEM1) that contains several other tools which use smoothing, including: four-tap intra interpolation filter, boundary prediction filters, and/or multi-parameter intra prediction (MPI), which can be replaced by position dependent intra prediction combination (PDPC).

Unfortunately, the above methods experience problems, including a high signaling effort and an oversmoothing of the video during encoding or decoding.

Disclosed herein is a method of selecting a filter strength in accordance with a propagation distance, which is the distance between a reference sample and the pixel being predicted. As will be more fully explained below, the propagation distance depends on an aspect ratio (e.g., width divided by height) of a block to be predicted and the directionality of the intra-prediction mode. The method applies to, for example, application of a smoothing filter or a sharpening filter.

Figure 4:
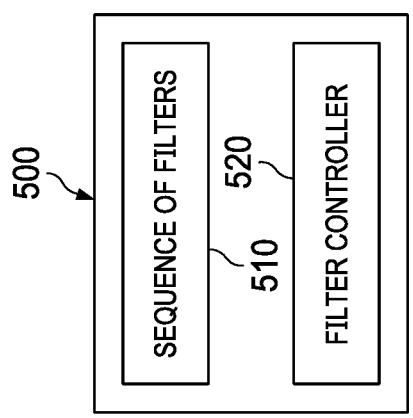
FIG. 4 illustrates a block to be predicted using one or more reference samples.

FIG. 4 illustrates a block 400 to be predicted using one or more reference samples 402. The reference samples 402 may also be referred to herein as reference pixels or base units (BUs). As shown, the reference samples 402 in FIG. 4 are disposed along the left and top edges of the block 400. However, reference samples 402 from other locations (not shown) may also be used during prediction. The block 400 has a width (W) of four pixels and a height (H) of eight pixels. However, the block 400 may have other dimensions in practical applications and have shapes other than a rectangular shape.

The block 400 may be predicted using one of several intra-prediction modes including, for example, a horizontal mode, a vertical mode, or a diagonal mode. For the purpose of discussion, the block 400 in FIG. 4 is depicted as being predicted using a diagonal prediction mode. The prediction direction 404 corresponding to the diagonal prediction mode selected for the block 400 is represented in FIG. 4 by three arrows.

When a pixel 406 within the block 400 is being predicted, a propagation distance 408 from the reference sample 402 to the pixel 406 along the prediction direction 404 is determined. Thereafter, the propagation distance 408 may be used to select one of a plurality of filter coefficients. In an embodiment, the reference samples 402 with a shorter propagation distance 408 (shown as checked boxes in FIG. 4) relative to the pixel being predicted (e.g., pixel 406) correspond to a weaker reference samples filter and the reference samples 402 with a longer propagation distance 408 (shown as clear boxes in FIG. 4) relative to the pixel being predicted correspond to a stronger reference samples filter.

An example of the process is provided. Assume that the propagation distance 408 corresponding to the pixel 406 in FIG. 4 is determined to be four (e.g., about four, rounded to four, etc.). Using the mapping found in Table 1, the filter coefficient of [1,6,1] is selected.

TABLE 1

| | Propagation distance | | | | | |
|---|---|---|---|---|---|---|
| | 0 . . . 3 | 4 . . . 12 | 13 . . . 20 | 21 . . . 48 | 48 . . . 64 | >64 |
| Filter coefficients | [1] | [1, 6, 1] | [3, 10, 3] | [1, 2, 1] | [2, 3, 6, 3, 2] | [2, 7, 14, 7, 2] |

As shown in Table 1, the strength of the filter coefficients increases from left to right in accordance with the propagation distance 408. That is, in an embodiment the strength of the filter coefficients is directly proportional to the propagation distance 408. Indeed, for a propagation distance of between 0 and 3 pixels, a relatively weak filter coefficient of [1] is applied. For a propagation distance of between 21 and 48 pixels, a stronger filter coefficient of [1,2,1] is applied. In addition, for a propagation distance of greater than 64 pixels, the strongest filter coefficient of [2,7,14,7,2] is applied. It should be appreciated that the parameters in Table 1 are provided for the purpose of discussion. Indeed, different propagation distances 408 and different filter coefficients may be used in practical applications.

Once one of the filter coefficients has been selected based on the propagation distance 408, the pixel 406 is predicted using the appropriate filter (e.g., a smoothing filter, a sharpening filter, etc.). In an embodiment, the prediction process is repeated until each of the pixels 406 in the block 400 has been predicted. Because each of the pixels 406 is predicted using a filter coefficient based the propagation distance 408 for that particular pixel, the coding process performed by the coding device is improved. The process of applying a filter coefficient based on the prediction distance 408 for a pixel 406 may be performed at both the encoder (e.g., the video encoder 20) and the decoder (e.g., the video decoder 30).

Figure 5:
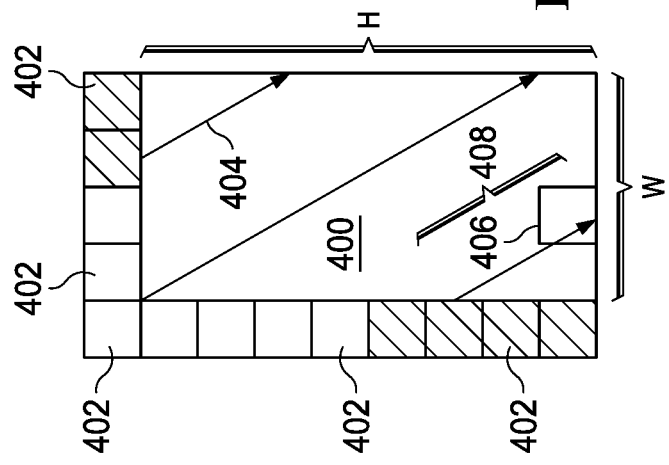
FIG. 5 is a video coding device configured to implement a filter coefficient selection process.

FIG. 5 is a video coding device 500 configured to implement the filter coefficient selection process described herein. The coding device 500 may be similar to the video encoder 20 or the video decoder 30 of FIG. 1. As shown, the coding device 500 includes a sequence of filters 510 and a filter controller 520.

The sequence of filters 510 may include, for example, one or more filters such as a RSAF, an interpolation filter for intra-prediction, and/or intra-predicted block filter. The intra-predicted block filter may include MPI, PDPC, and/or boundary smoothing. These filters can impact the results of intra-prediction by smoothing.

The sequence of filters 510 is configurable by one or more primary parameters and one or more secondary parameters. For example, a first set of filters of the sequence of filters 510 can be configurable by the primary parameters and a second set of filters of the sequence of filters 510 can be configurable by the second set of filters. The primary parameters and the secondary parameters may be one or more of the following: a size of a prediction unit, a size of a block being predicted, an intra-prediction mode, a multi-parameter intra mode index, and/or a reference sample filtering flag. In an embodiment, the first and second sets of filters overlap.

The filter controller 520 is configured to select or determine the filter coefficients based on the propagation distance (e.g., the propagation distance 408 in FIG. 4). The filter controller 520 is configured to adjust the one or more secondary parameters based on the one or more primary parameters and based on a strength criterion of the sequence of filters 510. In particular, the filter controller 520 can be configured to adjust the one or more secondary parameters partially based on the one or more first parameters. For example, a value of a secondary parameter can be partially based on a predetermined value, e.g., from a bitstream, and partially based on the adjustment based on the primary parameters.

In addition, the filter controller 520 can alternatively be configured to adjust the one or more secondary parameters based on the strength criterion of the sequence of filters 510. The filter controller 520 is also able to select a new set of parameters based on the intra-prediction mode and the propagation distance of reference samples. For example, in Table 1, it is exemplified that for a different propagation distance range, a set of different coefficients is designed. The information contained in Table 1 can be stored at both of the encoding side (e.g., in the video encoder 20) and the decoding side (e.g., in the video decoder 30). Because the information is stored, less information needs to be transmitted from the encoding side and decoding side. Indeed, the propagation distance range can be derived in decoding side independently and the corresponding coefficients can be looked up from the existent Table 1.

An intra-prediction procedure can be part of a hybrid video coding tool chain at an encoder side and/or at a decoder side. Similarly, an inter-prediction procedure can comprise a sequence of filters (e.g., interpolation filters and so called prediction filters) that are potentially able to cause either oversmoothing or oversharpening of a block used as a reference that, in fact, is an analogue of an intra-predicted block for inter-prediction.

Figure 6:
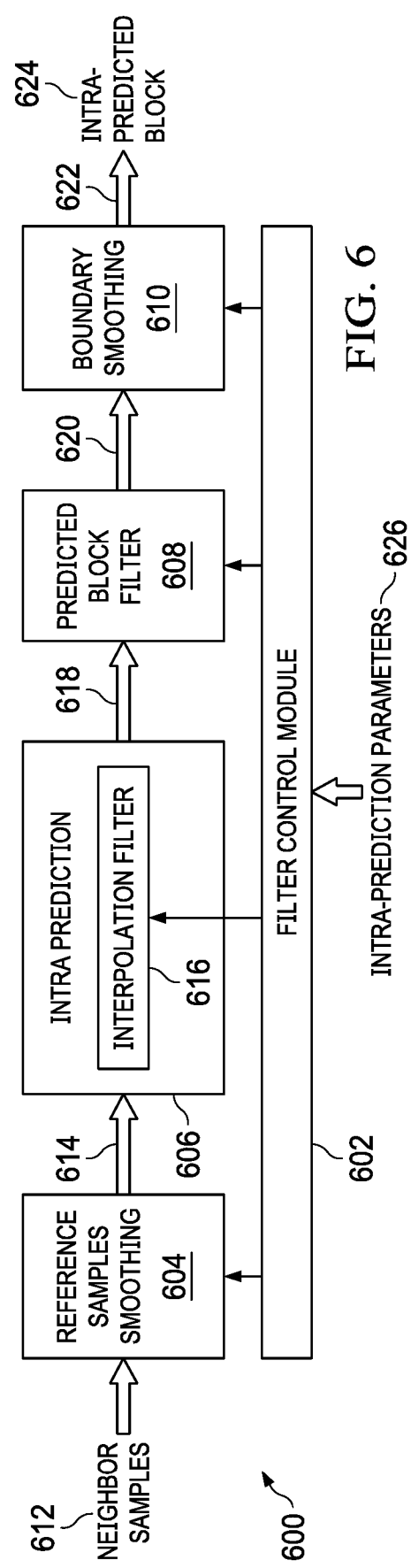
FIG. 6 illustrates an embodiment of a filter sequence.

FIG. 6 illustrates an embodiment of a filter sequence 600 (also referred to as sequence of filters). The filter sequence 600 is implemented by a filter control module 602. The filter control module 602 may be similar to the filter controller 520 of FIG. 5. In an embodiment, and as will be more fully explained below, the filter control module 602 is configured to adjust filtering parameters at different stages of intra-prediction.

In an embodiment, the sequence of filters 600 comprises a reference samples smoothing unit 604, an intra-prediction unit 606, a predicted block filter unit 608, and a boundary smoothing unit 610. The reference samples smoothing unit 604 is configured to receive one or more neighbor samples 612 as an input. The one or more neighbor samples 612 may be similar to the reference samples 402 of FIG. 4. The reference samples smoothing unit 604 is configured to smooth and/or further process the neighbor samples 612 to obtain one or more reference samples 614, which are provided to the intra-prediction unit 606 as input. The intra-prediction unit 606 comprises an interpolation filter 616. The output 618 of the intra-prediction unit 606 is received as input by the predicted block filter unit 608.

The predicted block filter unit 608 is configured to compute one or more predicted blocks 620, which are fed into the boundary smoothing unit 610 as input. The boundary smoothing unit 610 generates as output 622 one or more intra-predicted blocks 624.

In an embodiment, the filter control module 602 can be configured to read intra-prediction parameters 626 as primary parameters. In addition, the filter control module 602 can be configured to derive secondary parameters based on these primary parameters.

A video coding device (e.g., the video encoder 20, the video decoder 30) comprising the sequence of filters 600 can be configured to use implicit or explicit signaling of reference samples filter selectively, i.e., only to those TUs that meet specific conditions.

Quad-tree partitioning results can be used as an indication of reference samples filter selection using explicit or implicit signaling. In particular, when the size of a PU is larger than a threshold value (e.g., 32×32), the reference sample filter flag is set to zero. When a condition of a PU size is true, only "NO FILTER" and "APPLY WEAK FILTER" options may be selected in accordance with a PU size and/or intra mode conditions.

Disclosed herein is also a method of specifying hiding conditions used in the video coding process. As will be more fully explained below, hiding is used to signal information without introducing a new syntax element (e.g., Sign Bit Hiding) to the signaling. The hiding conditions are used by a decoder (e.g., the video decoder 30) to derive the presence of the hidden information. In an embodiment, hiding is performed within quantized transform coefficients.

In a first embodiment, the hiding condition is triggered when the number of significant quantized transform coefficients is less than a threshold (e.g., 3, 4, 5 significant coefficients). In a second embodiment, the hiding condition is triggered when the distance between the positions of a last and a first significant quantized transform coefficient is less than or equal to a threshold (e.g., 3, 4, 5 or 6 coefficient positions within a predefined scan order). In another embodiment, the hiding condition may be a combination of the aforementioned first and second embodiments.

The hiding conditions can be used as an indication of the presence of explicit signaling flags. For example, the position dependent prediction combination (PDPC) is disabled and PDPC flag is not coded when the number of significant quantized transform coefficients is less than a threshold. In an embodiment, adaptive reference samples smoothing (ARSS) hiding or explicit signaling is disabled when the distance between the positions of a last and a first significant quantized transform coefficient is less than or equal to a threshold.

Thus, the estimation of quantized residual signal coefficients is used to determine the list of intra-prediction tools that were used to generate prediction signal.

Disclosed herein is also a method of introducing a merge mode for a sequence of filters similar to the sequence of filters 510. As will be more fully explained below, instead of transmitting all parameter values for the sequence of filters, the values are taken from one or more neighboring blocks. To signify that the values have been taken from the one or more neighboring blocks, a merge flag is set.

Figure 7:
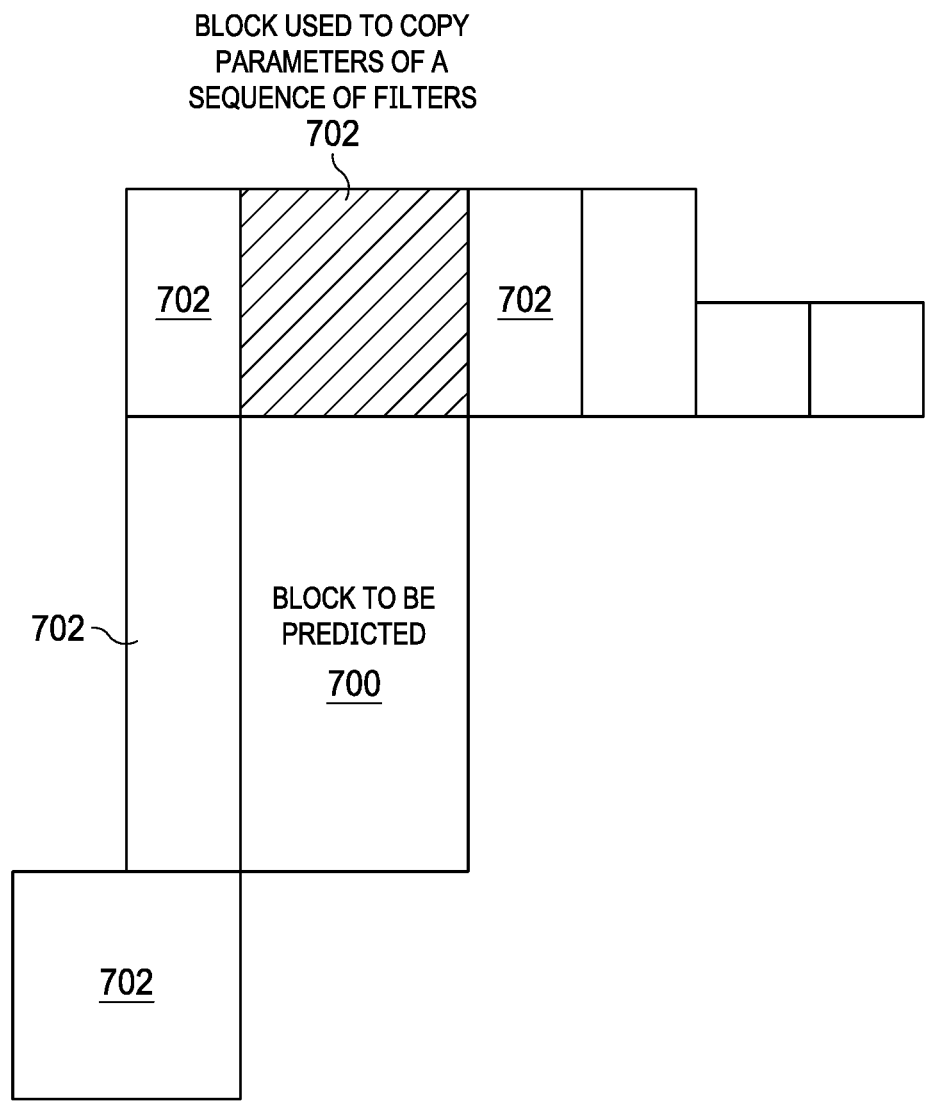
FIG. 7 illustrates a block to be predicted using parameter values for the sequence of filters that have been copied from one of the neighboring blocks.

FIG. 7 illustrates a block 700 to be predicted using parameter values for the sequence of filters that have been copied from one of the neighboring blocks 702. As shown in FIG. 7, the parameter values for the sequence of filters have been copied from a neighboring block 702 above the block 700. In an embodiment, parameter values for the sequence of filters may be copied from any one or more of the other neighboring blocks 702 shown in FIG. 7. To signify that the values have been taken from the one or more neighboring blocks, a merge flag is set to a binary value (e.g., 1).

Figure 8:
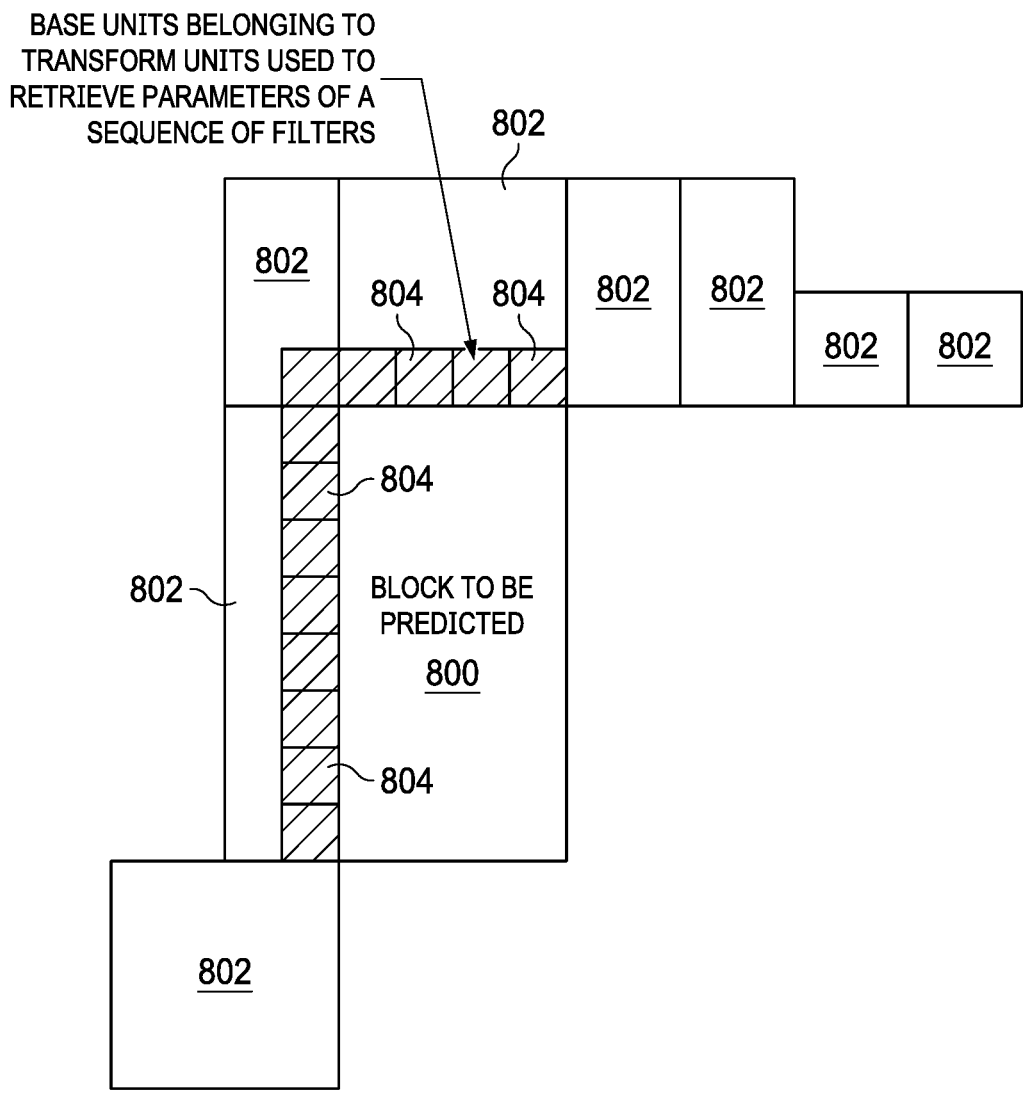
FIG. 8 illustrates a block to be predicted using parameter values for the sequence of filters that have been copied from one of the neighboring blocks.

FIG. 8 illustrates a block 800 to be predicted using parameter values for the sequence of filters that have been copied from one of the neighboring blocks 802. As demonstrated in FIG. 8, several neighboring blocks 802 are used to derive the parameter values for the sequence of filters. In this case, the parameter values are collected from each adjacent base unit (BU) 804 belonging to neighboring TUs (not shown). The collected parameter values are further processed to get the parameter values that will be applied to the block 800 to be predicted. For example, when the parameter values are binary (e.g., binary flags are used as filter parameters), a majority rule can be used according the following equation:

$$P = \arg\max\{N_{P=0}, N_{P=1}\}$$

where $N_{P=0}$ are $N_{P=1}$ represent the BUs with parameter values equal to 0 and 1, respectively.

Figures 9, 10:
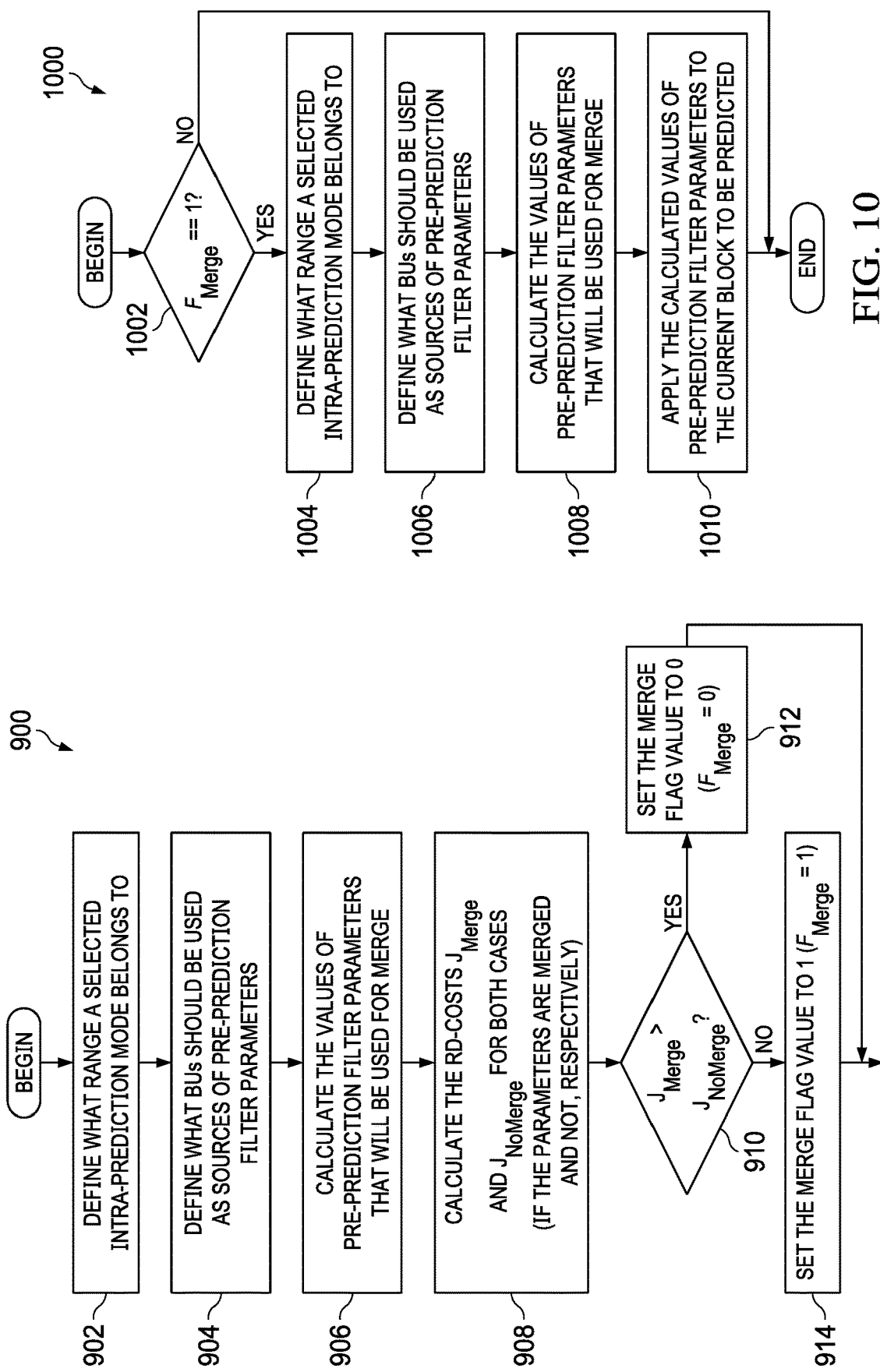
FIG. 9 is an embodiment of a method for making a cost-based rate-distortion optimization decision at an encoder side.
FIG. 10 is an embodiment of a method of using merged pre-prediction filter parameters at a decoder side.

FIG. 9 is an embodiment of a method 900 for making a cost-based rate-distortion optimization decision at an encoder side (e.g., at a video encoder 20). As will be more fully explained below, the method 900 is suitable for making a decision regarding the merging of pre-prediction filter parameters.

In block 902, a range that the selected intra-prediction mode belongs to is defined. In block 904, the BUs that should be used as sources for pre-prediction filter parameters are defined. In block 906, the values of pre-prediction filter parameters that will be used for merge are calculated. In block 908, the rate-distortion cost when parameters are merged, referred to as $J_{Merge}$, and the rate-distortion cost when parameters are not merged, referred to as $J_{NoMerge}$, are calculated.

In block 910, a comparison is made to determine whether $J_{Merge}$ is greater than $J_{NoMerge}$. If $J_{Merge}$ is greater than $J_{NoMerge}$, the "yes" branch is followed to block 912. In block 912, the merge flag value is set to a first binary value (e.g., 0) to indicate a result of the comparison. In contrast, if $J_{Merge}$ is not greater than $J_{NoMerge}$, the "no" branch is followed to block 914. In block 914, the merge flag value is set to a second binary value (e.g., 1) to indicate the result of the comparison. Thereafter, additional video encoding steps or processes may take place.

FIG. 10 is an embodiment of a method 1000 of using merged pre-prediction filter parameters at a decoder side (e.g., at video decoder 30). As will be more fully explained below, the method 1000 performed at the decoder side is similar to the method 900 performed at the encoder side.

In block 1002, the setting of a merge flag, referred to as $F_{merge}$, is checked. If the merge flag has not been set (e.g., $F_{merge}=0$), the "no" branch is followed and the method 1000 ends. If the merge flag has been set (e.g., $F_{merge}=1$), the "yes" branch is followed to block 1004. In block 1004, a range that the selected intra-prediction mode belongs to is defined. In block 1006, the BUs that should be used as sources for pre-prediction filter parameters are defined. In block 1008, the values of pre-prediction filter parameters that will be used for merge are calculated. In block 1010, the calculated values of the pre-prediction parameters are applied to the current block to be predicted. Thereafter, additional video decoding steps or processes may take place.

Figure 11:
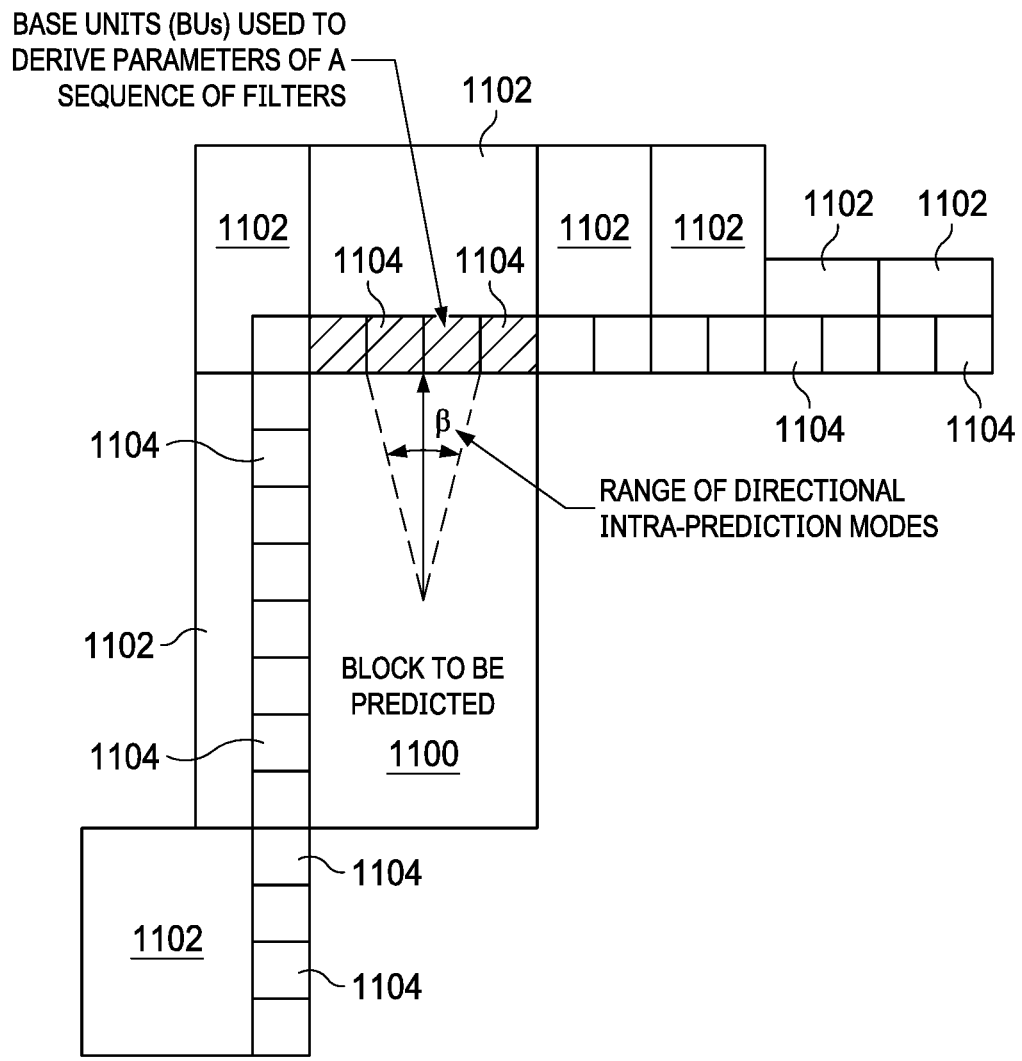
FIG. 11 illustrates a block to be predicted using parameter values collected from base units (BUs) in neighboring blocks according to an embodiment.
Figure 12:
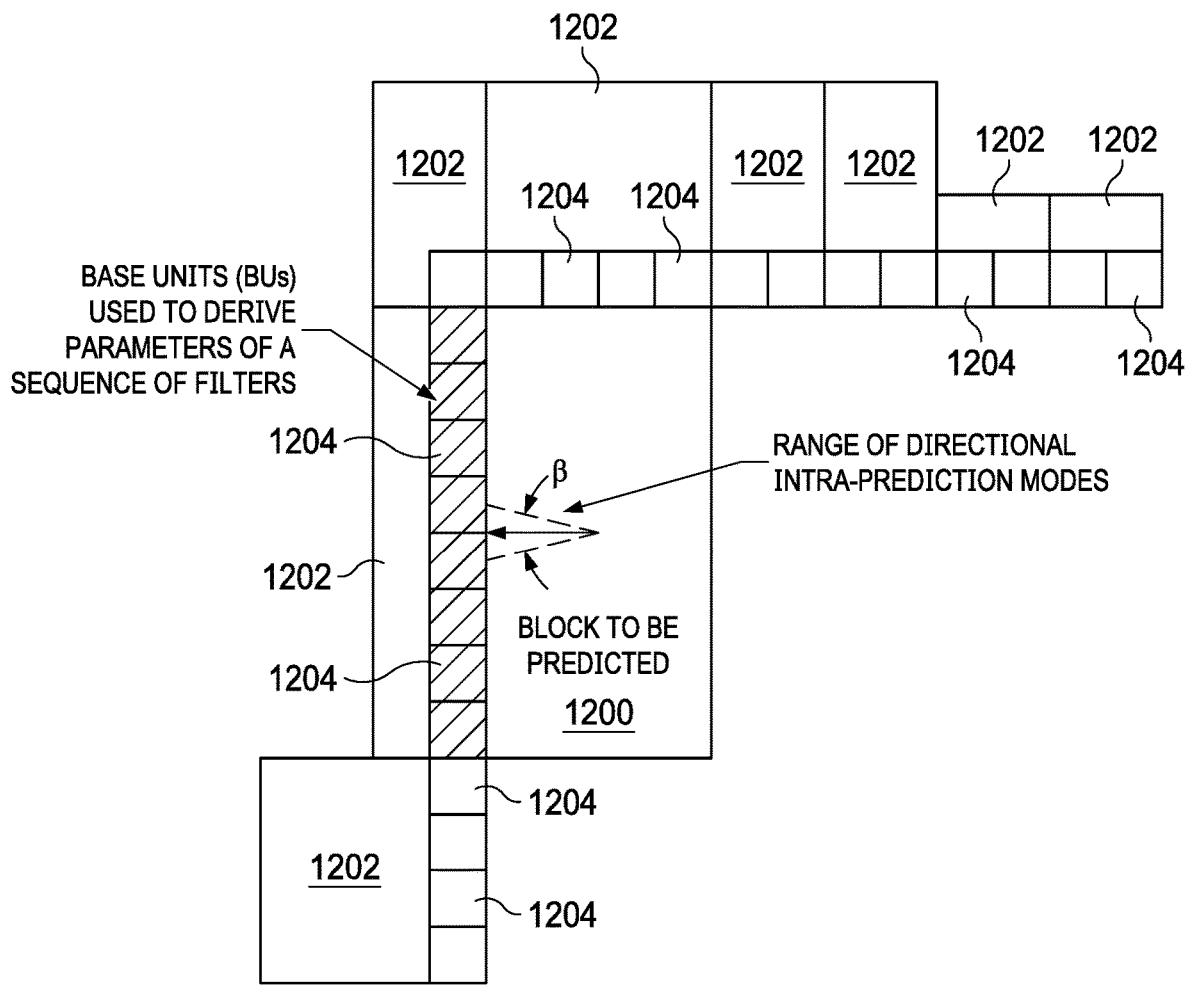
FIG. 12 illustrates a block to be predicted using parameter values collected from BUs in neighboring blocks according to an embodiment.

In an embodiment, pre-prediction filter parameters may be merged based on the dependency between a selected intra-prediction mode and positions of adjacent BUs that were used to derive parameter values for the sequence of filters. FIGS. 11-12 illustrate mechanisms for merging pre-prediction filter parameters in a vertical or close-to-vertical and horizontal and close-to-horizontal directional modes, respectively.

FIG. 11 illustrates a block 1100 to be predicted using parameter values collected from BUs 1104 in neighboring blocks 1102 according to an embodiment. The angular range β is used to determine the directional mode being used for prediction, which is vertical or close-to-vertical in FIG. 11. Here, the two middle BUs 1104 within in the top neighbor block 1102 fall within the angular range β (as shown by the dashed lines). Accordingly, only those two middle BUs 1104 within the angular range β are used in predicting block 1100 (or the pixels therein). In an embodiment, the filter parameters from the two middle BUs 1104 are merged together when predicting the current block 1100.

FIG. 12 illustrates a block 1200 to be predicted using parameter values collected from BUs 1204 in neighboring blocks 1202 according to an embodiment. Similar to FIG. 11, not just any BUs 1204 are used for prediction. Rather, only certain of the BUs 1204 are utilized. As shown in FIG. 12, the angular range β is used to determine the directional mode being used for prediction, which is horizontal or close-to-horizontal in FIG. 12. Here, the two middle BUs 1204 within in the left neighbor block 1202 fall within the angular range β (as shown by the dashed lines). Accordingly, only those two middle BUs 1204 within angular range β are used in predicting block 1200 (or the pixels therein). In an embodiment, the filter parameters from the two middle BUs 1204 are merged when predicting the current block 1200.

Figure 13:
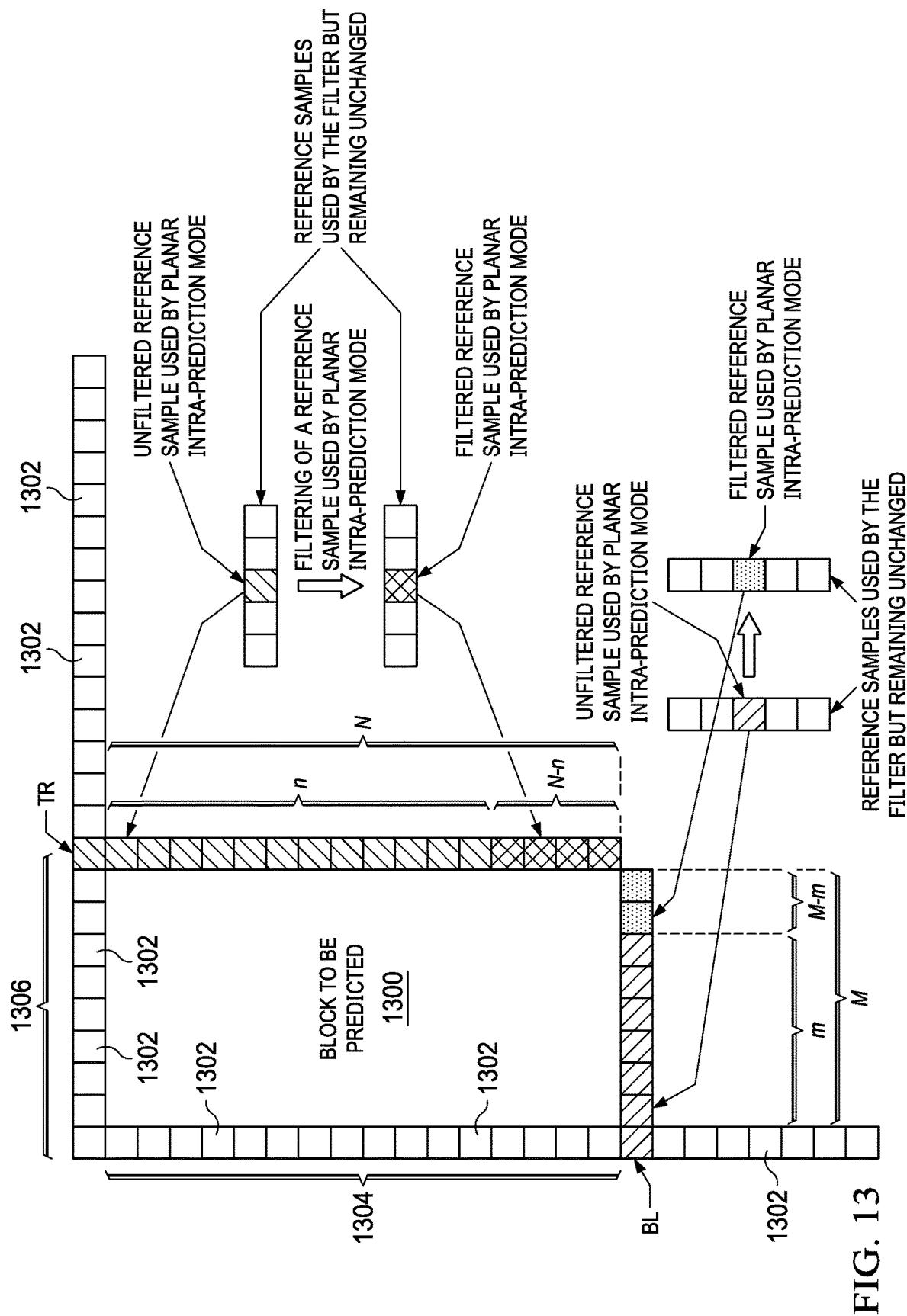
FIG. 13 illustrates a block to be predicted using parameter values collected from BUs in neighboring blocks according to an embodiment.

FIG. 13 illustrates a block 1300 to be predicted using parameter values collected from BUs 1302 in neighboring blocks (not shown) according to an embodiment. In particular, FIG. 13 illustrates changes in a reference sample filtering process for a planar intra-prediction mode.

Planar intra prediction uses two pairs of opposite sides (e.g., one pair formed from a right and left side, and another pair formed from a top and bottom side) to predict a value within a block to be predicted (e.g., block 1300). The reference samples from left and top sides 1304, 1306, respectively, are reconstructed pixel values. The right side N is generated by copying the top-right (TR) reference sample. The bottom side M is generated by copying the bottom-left (BL) reference sample. In an embodiment, ARSS is applied to get just one filtered value of reference sample TR to modify values the on the right side N and just one filtered value of reference sample BL to modify the values on the bottom side M.

In an embodiment, the right-side and bottom-side pixels (shown as hatched boxes) are generated by combining the filtered or unfiltered value of the TR reference sample and by combining the filtered or unfiltered value of the BL reference sample, respectively. The selection of filtered or unfiltered reference values is performed according to the position of the generated samples within the bottom side M or within the right side N. Each of the bottom and right sides M, N is partitioned into two subsets according to predefined values m for the bottom side M and predefined values n for the right side N. In an embodiment, the predefined values m, n are selected based on, for example, block width and height. Unfiltered reference samples are copied into subsets n and m related to the right and bottom sets, respectively. Filtered reference samples are copied into subsets N-n and M-m related to the right and bottom sets, respectively.

For the purpose of illustration, the filtered and unfiltered reference samples used by the planar intra-prediction mode have been given distinct hatching patterns. Likewise, the reference samples that are used, but unfiltered, have been illustrated without any hatching.

In an embodiment, a filter applied to the reference sample is selected subject to block width for reference sample TR and block height for reference sample BL. In an embodiment, a filter applied to the reference sample is selected subject to a block aspect ratio, i.e., the ratio of block width to block height when the block 1300 is horizontally oriented and the ratio of block height to block width when the block 1300 is vertically oriented.

FIG. 14 is an embodiment of a method 1400 of coding implemented by a decoding device such as the video decoder 30 of FIG. 3. The method 1400 is performed when more efficient video coding is desirable. In block 1402, a prediction direction for a current block is determined. The prediction direction may be horizontal, close-to-horizontal, vertical, close-to-vertical, diagonal, and so on. In block 1404, a propagation distance along the prediction direction is determined. In an embodiment, the propagation distance is measured between a pixel to be predicted in the current block and a reference sample adjacent to the current block.

In block 1406, one of a plurality of filter coefficients is selected based on the propagation distance. In an embodiment, the selection is made using Table 1, above. In block 1408, the pixel in the current block is predicted using a filter and the filter coefficient that was selected. In an embodiment, the filter is a smoothing filter or a sharpening filter. In block 1410, an image including the pixel that was predicted is displayed on the display of an electronic device.

FIG. 15 is an embodiment of a method 1500 of coding implemented by an encoding device such as the video encoder 20 of FIG. 2. The method 1500 is performed when more efficient video coding is desirable. In block 1502, a prediction direction is determined for a current block. The prediction direction may be horizontal, close-to-horizontal, vertical, close-to-vertical, diagonal, and so on. In block 1504, a propagation distance along the prediction direction is determined. In an embodiment, the propagation distance is measured between a pixel to be predicted in the current block and a reference sample adjacent to the current block.

In block 1506, one of a plurality of filter coefficients is selected based on the propagation distance. In an embodiment, the selection is made using Table 1, above. In block 1508, the pixel in the current block is predicted using a filter and the one of the plurality of filter coefficients that was selected. In an embodiment, the filter is a smoothing filter or a sharpening filter. In block 1510, a bitstream containing an image including the pixel is transmitted to a decoding device (e.g., the video decoder 30) configured to decode the bitstream.

FIG. 16 is a schematic diagram of a coding device 1600 according to an embodiment of the disclosure. The coding device 1600 is suitable for implementing the disclosed embodiments as described herein. The coding device 1600 comprises ingress ports 1610 and receiver units (Rx) 1620 for receiving data; a processor, logic unit, or central processing unit (CPU) 1630 to process the data; transmitter units (Tx) 1640 and egress ports 1650 for transmitting the data; and a memory 1660 for storing the data. The coding device 1600 may also comprise optical-to-electrical (OE) components and electrical-to-optical (EO) components coupled to the ingress ports 1610, the receiver units 1620, the transmitter units 1640, and the egress ports 1650 for egress or ingress of optical or electrical signals.

The processor 1630 is implemented by hardware and software. The processor 1630 may be implemented as one or more CPU chips, cores (e.g., as a multi-core processor), field-programmable gate arrays (FPGAs), application specific integrated circuits (ASICs), and digital signal processors (DSPs). The processor 1630 is in communication with the ingress ports 1610, receiver units 1620, transmitter units 1640, egress ports 1650, and memory 1660. The processor 1630 comprises a references sample processing (RSP) module 1670. The RSP module 1670 implements the disclosed embodiments described above. For instance, the RSP module 1670 implements, processes, prepares, or provides the various coding operations. The inclusion of the RSP module 1670 therefore provides a substantial improvement to the functionality of the coding device 1600 and effects a transformation of the coding device 1600 to a different state. Alternatively, the RSP module 1670 is implemented as instructions stored in the memory 1660 and executed by the processor 1630.

The memory 1660 comprises one or more disks, tape drives, and solid-state drives and may be used as an overflow data storage device, to store programs when such programs are selected for execution, and to store instructions and data that are read during program execution. The memory 1660 may be volatile and/or non-volatile and may be read-only memory (ROM), random access memory (RAM), ternary content-addressable memory (TCAM), and/or static random-access memory (SRAM).

A method of coding implemented by a decoding means. The method includes determining, by the decoding means, a prediction direction for a current block; determining, by the decoding means, a propagation distance along the prediction direction, the propagation distance measured between a pixel to be predicted in the current block and a reference sample adjacent to the current block; selecting, by the decoding means, one of a plurality of filter coefficients based on the propagation distance; predicting, by the decoding means, the pixel in the current block using a filter and the one of the plurality of filter coefficients that was selected; and displaying, by the decoding means, an image including the pixel that was predicted.

A method of coding implemented by an encoding means. The method includes determining, by the encoding means, a prediction direction for a current block; determining, by the encoding means, a propagation distance along the prediction direction, the propagation distance measured between a pixel to be predicted in the current block and a reference sample adjacent to the current block; selecting, by the encoding means, one of a plurality of filter coefficients based on the propagation distance; predicting, by the encoding means, the pixel in the current block using a filter and the one of the plurality of filter coefficients that was selected; and transmitting, by the encoding means, a bitstream containing an image including the pixel to a decoding device configured to decode the bitstream.

A decoding device comprising: receiving means configured to receive a bitstream from an encoding device, the bitstream containing an image; processing means coupled to the receiving means, the processing means configured to: select a current block from within the image; determine a prediction direction for the current block; determine a propagation distance along the prediction direction, the propagation distance measured between a pixel to be predicted in the current block and a reference sample adjacent to the current block; select one of a plurality of filter coefficients based on the propagation distance; predict the pixel in the current block using a filter and the one of the plurality of filter coefficients that was selected; and a display means operably coupled to the processing means, the display means configured to display an image including the pixel that was predicted.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of coding implemented by a decoding device, comprising:
   determining, by the decoding device, a prediction direction for a current block;
   determining, by the decoding device, a propagation distance along the prediction direction, the propagation distance measured between a pixel to be predicted in the current block and a reference sample adjacent to the current block;
   selecting, by the decoding device, a set of filter coefficients based on which one of a plurality of different available ranges of propagation distances contains the propagation distance that was determined;
   predicting, by the decoding device, the pixel in the current block using a filter and the set of filter coefficients that was selected; and
   displaying, on a display of an electronic device, an image including the pixel that was predicted.

2. The method of claim 1, wherein a strength of the set of filter coefficients that was selected is based on the propagation distance that was determined.

3. The method of claim 1, wherein sets of filter coefficients, including the set of filter coefficients that was selected, are arranged from weak to strong.

4. The method of claim 3, wherein the sets of filter coefficients contain weaker filter coefficients corresponding to shorter propagation distances and stronger filter coefficients corresponding to longer propagation distances.

5. The method of claim 1, wherein the prediction direction is horizontal or vertical.

6. The method of claim 1, wherein the prediction direction is diagonal.

7. The method of claim 1, wherein the filter is a smoothing filter.

8. The method of claim 1, wherein the filter is a sharpening filter.

9. The method of claim 1, further comprising storing a table mapping the plurality of different available ranges of propagation distances to sets of filter coefficients, including the set of filter coefficients that was selected, in a memory of the decoding device.

10. A method of coding implemented by an encoding device, comprising:
    determining, by the encoding device, a prediction direction for a current block;
    determining, by the encoding device, a propagation distance along the prediction direction, the propagation distance measured between a pixel to be predicted in the current block and a reference sample adjacent to the current block;
    selecting, by the encoding device, a set of filter coefficients based on which of a plurality of different available ranges of propagation distances contains the propagation distance;
    predicting, by the encoding device, the pixel in the current block using a filter and the set of filter coefficients that was selected; and
    transmitting, by the encoding device, a bitstream containing an image including the pixel to a decoding device configured to decode the bitstream.

11. The method of claim 10, wherein a strength of the set of filter coefficients that was selected is based on the propagation distance that was determined.

12. The method of claim 10, wherein sets of filter coefficients, including the set of filter coefficients that was selected, are arranged from weak to strong.

13. The method of claim 12, wherein the sets of filter coefficients contain weaker filter coefficients corresponding to shorter propagation distances and stronger filter coefficients corresponding to longer propagation distances.

14. The method of claim 10, wherein the prediction direction is diagonal.

15. The method of claim 10, wherein the filter is a smoothing filter.

16. The method of claim 10, wherein the filter is a sharpening filter.

17. A decoding device, comprising:
    a receiver configured to receive a bitstream from an encoding device, the bitstream containing an image;
    a processor coupled to the receiver, the processor configured to:
      select a current block from within the image;
      determine a prediction direction for the current block;
      determine a propagation distance along the prediction direction, the propagation distance measured between a pixel to be predicted in the current block and a reference sample adjacent to the current block;
      select a set of filter coefficients based on which one of a plurality of different available ranges of propagation distances contains the propagation distance;
      predict the pixel in the current block using a filter and the set of filter coefficients that was selected; and
    a display operably coupled to the processor, the display configured to display an image including the pixel that was predicted.

18. The decoding device claim 17, wherein a strength of the set of filter coefficients that was selected is based on the propagation distance that was determined.

19. The decoding device claim 17, wherein sets of filter coefficients, including the set of filter coefficients that was selected, are arranged from weak to strong, and wherein the sets of filter coefficients contain weaker filter coefficients corresponding to shorter propagation distances and stronger filter coefficients corresponding to longer propagation distances.

20. The decoding device claim 17, further comprising a memory coupled to the processor, the memory configured to store a table mapping the plurality of different available ranges of propagation distances to sets of filter coefficients including the set of filter coefficients that was selected.

\* \* \* \* \*

UNITED STATES PATENT AND TRADEMARK OFFICE
CERTIFICATE OF CORRECTION

PATENT NO. : 10,728,548 B2  
APPLICATION NO. : 15/943853  
DATED : July 28, 2020  
INVENTOR(S) : Filippov et al.

Page 1 of 1

It is certified that error appears in the above-identified patent and that said Letters Patent is hereby corrected as shown below:

In the Claims

Column 22, Lines 58-67, Claims 18-19, through Column 23, Lines 1-5, Claim 20, should read as:
18. The decoding device of claim 17, wherein a strength of the set of filter coefficients that was selected is based on the propagation distance that was determined.
19. The decoding device of claim 17, wherein sets of filter coefficients, including the set of filter coefficients that was selected, are arranged from weak to strong, and wherein the sets of filter coefficients contain weaker filter coefficients corresponding to shorter propagation distances and stronger filter coefficients corresponding to longer propagation distances.
20. The decoding device of claim 17, further comprising a memory coupled to the processor, the memory configured to store a table mapping the plurality of different available ranges of propagation distances to sets of filter coefficients including the set of filter coefficients that was selected.

Signed and Sealed this  
First Day of September, 2020

Andrei Iancu  
*Director of the United States Patent and Trademark Office*